Feb. 22, 1949.　　　　A. L. FLAMM　　　　2,462,623
STAPLING DEVICE
Filed March 22, 1945　　　　　　　　　　2 Sheets-Sheet 1
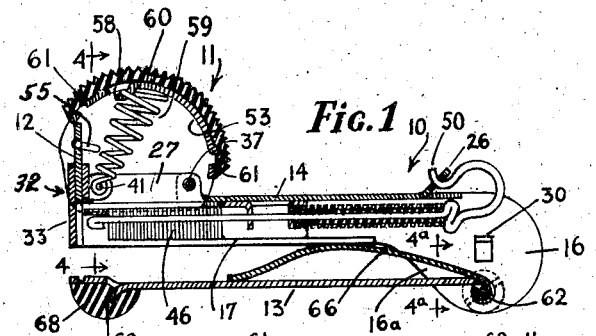
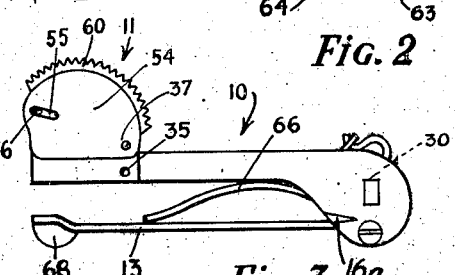
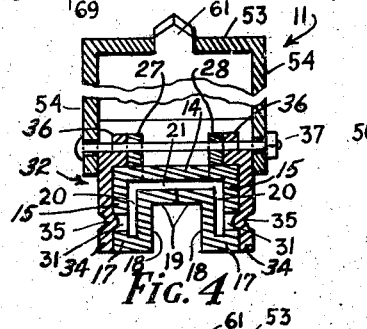
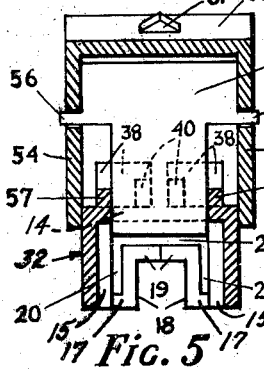
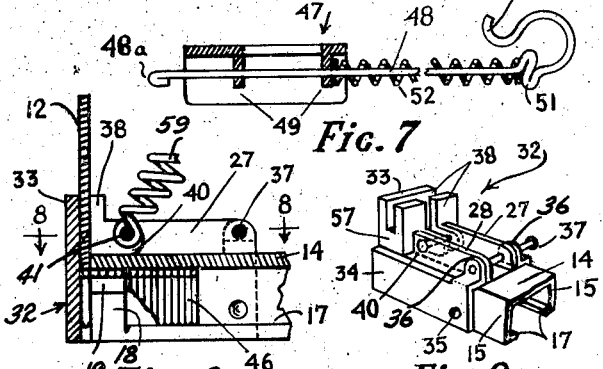
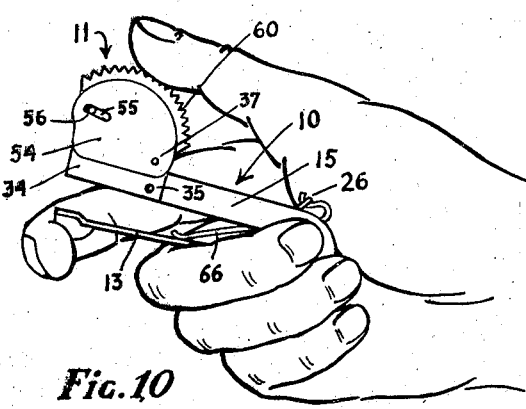
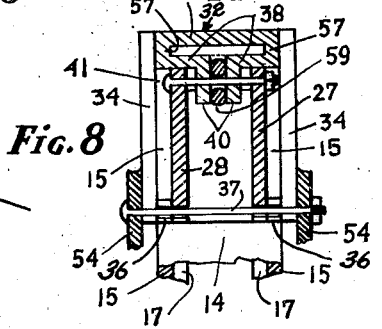
INVENTOR
ALEXANDER L. FLAMM
BY John J. Hanrahan
ATTORNEY Feb. 22, 1949.　　　A. L. FLAMM　　　2,462,623
STAPLING DEVICE Filed March 22, 1945　　　　　　　　　　　2 Sheets-Sheet 2

INVENTOR
ALEXANDER L. FLAMM
BY
ATTORNEYS

Patented Feb. 22, 1949

2,462,623

UNITED STATES PATENT OFFICE 2,462,623

STAPLING DEVICE

Alexander L. Flamm, Fairfield, Conn.

Application March 22, 1945, Serial No. 584,173

5 Claims. (Cl. 1—49)

This invention relates to new and useful improvements in staple driving machines and has particular relation to a small pocket type of machine adapted especially for use by insurance agents, canvassers and the like.

The objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a longitudinal sectional view showing a staple driving machine constructed according to the invention;

Fig. 2 is a front elevational view of said machine;

Fig. 3 is a side elevational view of the machine;

Fig. 4 is an enlarged sectional view taken as along the line 4—4 of Fig. 1;

Fig. 4a is a detail sectional view showing the manner in which the rear portion of the body of the machine engages the spring base of the machine;

Fig. 5 is a somewhat similar view but is taken immediately forwardly of the staple driver of the machine;

Fig. 6 is an enlarged longitudinal sectional view of the forward portion of the machine;

Fig. 7 is a detached view of the follower means of the machine;

Fig. 8 is a sectional view taken as along the line 8—8 of Fig. 6;

Fig. 9 is a perspective view of the forward end portion of the stapling arm of the machine, the driver operating head being omitted;

Fig. 10 is a general view of the machine showing the same as held in the hand of an operator ready for use;

Figure 11:
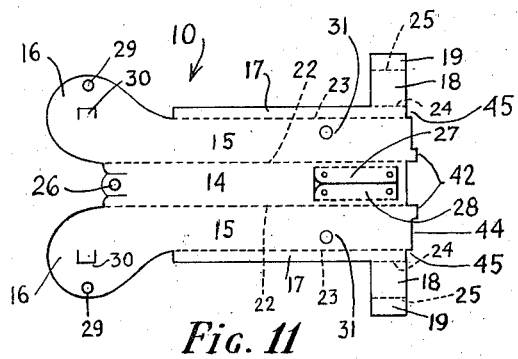
Fig. 11 shows the blank or pattern for the making of the housing and staple guiding parts of the machine.

The staple driving machine of the invention is adapted to be used either as a stapling machine or as a tacker and as shown, comprises essentially a housing or body generally designated 10 and having a raceway at its forward end, a head 11 for operating a driver 12 through said raceway, and a spring metal base-like member 13. Housing 10 is a combination of a housing and a staple guiding means and is an integral structure made up from the blank shown in Fig. 11 and in which blank the parts are given the same numbers as in the formed housing. The housing comprises a top wall 14 and parallel or substantially parallel side walls 15, the rear portions 16 of which extend beyond the top wall and are considerably enlarged to extend below or beyond the plane of the lower edges of the main portions of the side walls.

On the lower edges of the main portions of the side walls are ledges 17 extending toward one another and arranged in substantially parallel relation with the top wall 14. Extensions 18 (Fig. 6) on the forward portions of the inner edges of the ledges 17 extend vertically in slightly spaced relation to the respective side walls of the housing and at their upper ends carry lugs 19, the free edges of which may abut. With particular reference to the Figs. 4 and 5 it is noted that the spaces 20 between the extensions 18 and the respective side walls 15 are such as to accommodate the legs of a staple and that the lugs 19 are parallel with the top wall 14 but that there is a space 21 between such parts sufficient to accommodate the crown of a staple.

It will now be apparent that the housing 10 is formed by bending the blank of Fig. 11 along the dotted lines shown in that fifure. Thus, by bending along the dotted lines 22 the side walls 15 are disposed at right angles to the top wall 14 and by bending along the dotted lines 23 the ledges 17 are turned inwardly into position at right angles to the side walls and parallel with the top wall and that by bending along the dotted lines 24, the extensions 18 are correctly located and that positioning of the lugs 19 requires bending of the blank along the dotted lines 25.

A perforated lug 26 is lanced and pressed upwardly from the rear end portion of wall 14 and toward the front end of such wall a pair of perforated flange-like portions 27 and 28 are lanced and pressed upwardly and are disposed at right angles to the wall. Additionally, the enlarged end portions 16 of the side walls of the housing are perforated at 29 and above such perforations, lugs 30 are lanced and pressed from the portions 16 and extend inwardly therefrom toward one another. In addition the side walls 15 inwardly of their forward ends are provided with perforations 31. The functions of these various flanges, lugs, and perforations will later be fully apparent.

Figure 12:
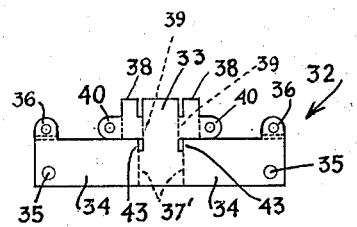
Fig. 12 is a similar view of a part to be mounted on the forward end of the housing and forming part of the staple driver guiding means.
Figure 13:
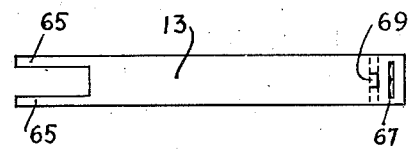
Fig. 13 shows the pattern of the base-like part of the machine.

Disposed on the forward end portion of the housing 10 is a raceway defining member generally designated 32 and comprising an integral structure made up from the blank shown in Fig. 12. Thus, member 32 comprises a front wall 33 which constitutes the front side of the raceway in which the driver 12 reciprocates. Additionally the member includes a pair of side wall portions 34 which embrace the forward portions of the side walls 15 of the housing and the walls 34 have tit-like lugs 35 pressed therefrom and entering the perforations 31 in the side walls 15 as best shown in Fig. 4. On the upper rear edges of walls 34 are perforated ears 36 through which pass a means 37 which also passes through the rear perforations in the flanges 27 and 28. Means 37 is shown as a bolt and nut means although other forms of pivot may be used. A means which is easily removable is preferred as will later appear.

Obviously, the blank of Fig. 12 is folded on the dotted lines 37¹ in order to properly locate the walls 34 relative to the wall 33. It is noted that the last mentioned wall carries wing-like extensions 38 which are folded on the dotted lines 39 and then folded again whereby to dispose said extensions 38 in positions slightly to the rear of but parallel with the upper portion of the front wall 33 (see particularly Figs. 6, 8, and 9) whereby such extensions assist in defining the raceway in which plunger 12 operates.

Ears 40 carried by the extensions 83 are folded to extend rearwardly from such extensions and a means 41 (preferably similar to means 37) passes through such ears and the forward perforations in the flanges 27 and 28 (see Fig. 8). It will thus be seen that the member 32 is securely mounted on the forward portion of the housing 10 and as an additional means for locating these parts, such housing includes a pair of short projections 42 passing through openings 43 at the edges of the wall 33. The side walls 15 of body 10 have their forward edges 44 disposed slightly beyond the forward edges of the extensions 18 whereby shoulders 45 are formed, and it is noted that shoulders are of a width equal to the thickness of the stock of which the staples 46 (see Figs. 1 and 6) are made.

In the assembly wall 33 of member 32 is against the forward edges 44 of the side walls of the housing whereby there is a continuous front side to the raceway in which the driver 12 operates. The staples 46 are loaded into the machine from the rear thereof and are disposed with the lower or free ends of their legs on the ledges 17 and with the outer sides of their legs substantially in engagement with the inner surfaces of the housing walls 15.

A follower 47 which transversely is in the form of an inverted U is located within the housing and has the lower edges of its arms disposed on the ledges 17 whereby the forward edges of its arms and the forward edge of its connecting portion are against the rear sides of the legs and crown respectively of the rearmost staple 46. A rod 48 passes freely through a pair of downturned lugs 49 comprising parts of the follower and this rod has its forward end 48 bent back on itself or otherwise enlarged so that it may not move through the perforations in lugs 49. The rear portion of the rod is upturned and bent to provide a hook-like portion 50 engaged in the perforations in lug 26.

In this way the rod is anchored, and disposed about a portion of the rod is a coil spring 52 which at its rear end bears against an upset portion 51 of the rod and its forward end against one of the lugs 49 whereby the spring is constantly tending to move the follower toward the forward end of the housing to feed the staples 46 into the above mentioned raceway. Since the rod 48 is provided with the upsets 48a and 51, a simple construction suitable for the purpose and without washers and the like is provided. The few staples immediately rearwardly of the foremost staple (which will be in the raceway) are located in positions straddling the extensions 18 and lugs 19 whereby the crown portions of these staples are braced so that as the driver 12 is moved downwardly in the raceway, it may shear the foremost staple from the strip but the second and a few subsequent staples are being braced by the lugs 19.

Head 11 is an integral one piece stamping and includes an arcuate top wall 53 and side walls 54 which latter are spaced apart to be in planes immediately outwardly of the planes in which the walls 34 of part 32 are located. The bolt or other fastening means 37 above referred to passes also through such side walls 54 of the head toward the rear ends of said walls whereby the head is pivotly mounted for a rocking movement on such means 37. Upwardly and forwardly inclined slots 55 in the walls 54 receive pin-like extensions 56 carried by the lateral edges of the upper portion of the driver (which upper portion as shown in Fig. 5 is of a width to fit substantially snugly between the walls 54).

Portions 57 of the member 32 further serve as lateral guides for the driver. A lug 58 struck from the wall 53 of the head 11 has one end of a compression coil spring 59 hooked thereon and the other end of said spring is anchored on the rivet 41 above mentioned. The spring is arranged at an incline and is shown in fully extended position in Fig. 1 and it will be obvious that on the head 11 being rocked about the pivot 37 from the position Fig. 1 the spring 59 will be compressed in the direction of its length and the pin and slot engagement between the head and the driver will result in the latter being moved downwardly through the raceway to drive a staple therethrough.

The machine may be used as suggested in Fig. 10 and as a measure of protection to the thumb of the operator, a rubber pad 60 is secured on the top wall 53 of the head either or both by cement and the lugs 61 lanced and pressed from such wall of the head. If desired the pad 60 may be omitted and the outer surface of wall 53 may be knurled or otherwise treated so that the thumb of the operator will not slip on it. A bolt 62 connects the lower rear portions 16 of the side walls of the housing and its head 63 as well as its nut 64 are knurled whereby the bolt may be loosened as occasion may require but for a purpose to be set forth.

Base-like portion 13 is bifurcated at its rear end whereby it includes a pair of spaced finger-like portions 65 which are wrapped about the bolt 62 immediately inwardly of the side walls of the housing and a spring 66 has an end portion partly wrapped about said bolt between said fingers. Adjacent its forward end and in a line with the driver 12 base 13 is provided with any or usual staple clinching recesses 67, and on the under side of its forward end may carry a cushion 68 of rubber or the like secured in place as by a lug 69 lanced and pressed from the base. With the arrangement described it will be clear that as the head 11 is rocked about the pivot 37 the driver 12 will be moved through the raceway to drive a staple therethrough and that on the head being released the spring 59 will return the parts to their normal positions.

With the parts positioned as in drawings, any papers or the like to be stapled together are inserted between the base and the lower end of the raceway and a staple is driven by driver 12 and clinched by contacting with the base.

If the device is to be used as a tacker, nut 64 is loosened and the base swung to an out of the way position leaving the lower end of the raceway clear. The base itself is of resilient material so that there is a certain spring action and portions of the wall 16 are crimped in as at 16a (see Fig. 4a) and engage the base whereby the housing and base are normally retained in spaced relation. During driving of a staple, the spring base yields permitting the front end portions of the housing and the base to move together as will be understood.

Should the raceway become clogged, the bolt or other means 37 may be removed (if such means is a rivet it may be cut off) and the head 11 and driver 12 disconnected from the machine. Then the upper end of the raceway is exposed and any crumpled staple therein may be pushed out of the raceway. Additionally, by removing means 41 the entire member 32 may be removed from the body of the machine for clearing of the raceway.

Figures 15, 16:
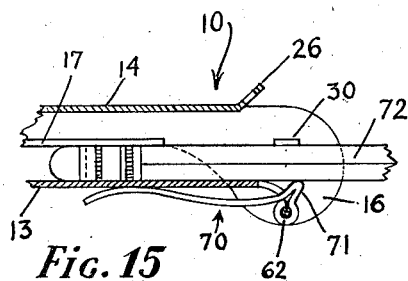
Fig. 15 is a sectional view through the rear portion of the machine and showing a modified spring construction in position securing the machine on the end portion of a pencil.
Fig. 16 is a similar view but with the spring in unlocked position whereby the machine may be adjusted on or removed from the pencil.
Figure 17:
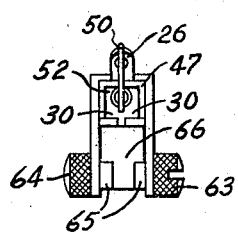
Fig. 17 is a rear elevational view of the machine of Figs. 1 through 10 on the scale of Fig. 1.
Figure 18:
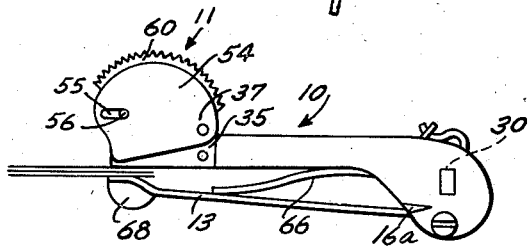
Fig. 18 is a side elevational view of the machine showing the relative positions of the parts when a staple is being driven.

When machine is to be carried on a pencil according to the modifications suggested in Figs. 15, 16, and 17, the spring 66 is omitted and a spring 70 is mounted on the bolt 62 but with its main arm located at the under side of the base 13. Such spring 70 includes an offset cam-like portion 71 which when the spring is positioned as in Figs. 3 and 15, bears against a portion of the pencil 72 and clamps it against the lugs 30 above mentioned. With the parts positioned as in Fig. 15, the pencil maintains the base spaced from the body of the machine although when the pencil is withdrawn to the extent shown in Fig. 15, the machine may be used to staple papers or the like together, since the base 13 is sufficiently springy to yield toward the head for the purpose of clinching the staple.

It is better policy, however, when a staple is to be driven to rock the spring through dead center position to the position in Fig. 16 where the portion 71 of the spring is not clamping the pencil and the latter may be wholly or partly drawn from the device. When the machine is to be used as a tacker, the spring is swung still further in a counter-clockwise direction as viewed in the drawings and the base 13 may also be swung to an out of the way position, the pencil having first been withdrawn from the machine.

Figure 14:
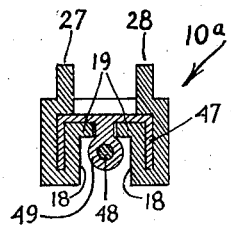
Fig. 14 is a view somewhat similar to the lower part of Fig. 4 but showing a slight modification.

Fig. 14 shows a slight modification of the housing structure wherein the lugs 19 are spaced apart to permit of further advance movement of the follower which forwardly of the lugs 49 may be shortened to permit a greater number of staples being placed in the machine at one time and yet the last staple in the machine may be pushed into the raceway. It is noted that the spacing of the lugs 19 permits of the foremost lug 49 of the follower moving between the lugs 19 so that the follower may be moved as suggested.

Having thus set forth the nature of my invention, what I claim is:

1. In a stapling machine, a housing having a raceway therein, means for feeding staples to said raceway, means for driving staples through said raceway, a base, means pivoting together the rear portions of said housing and base, means on said housing forwardly of said pivot and engaging said base whereby the forward portions of the housing and base are spaced apart, said base being of spring metal whereby to yield and have the forward portions of the housing and base come into engagement during driving of a staple through said raceway.

2. In a staple driving machine, a body, means on the forward end of said body and forming therewith a raceway, a head mounted on said body and enclosing a portion of said means, a driver movable with said head and adapted to drive staples through said raceway, a pair of means securing said first means to said body, one of said pair of means serving also to pivotly mount the head on said body, and each of said pair of means comprising removable means whereby the head and the first means may be removed from said body for cleaning of said raceway.

3. In a staple driving machine, a housing having means for feeding and driving staples, a base on which said housing is mounted spaced from said housing so as to provide an opening through the rear end of the machine of a size to receive a pencil, and spring means for securing said machine to a pencil so partly received.

4. In a staple driving machine, a housing having means for feeding and driving staples, a base on which said housing is mounted spaced from said housing so as to provide an opening through the rear end of the machine of a size to receive a pencil, a lever pivoted on said machine and having an off-set portion, and said lever swingable through a dead center position to have said off-set portion clampingly engage said pencil.

5. In a staple driving machine, a housing having means for feeding and driving staples, a base on which said housing is mounted spaced from said housing so as to provide an opening through the rear end of the machine of a size to receive a pencil, and means for securing said machine to a pencil so partly received.

ALEXANDER L. FLAMM.

REFERENCES CITED

The following references are of record in the file of this patent:

UNITED STATES PATENTS

| Number | Name | Date |
| --- | --- | --- |
| 679,598 | Brunner | July 30, 1901 |
| 2,218,934 | German | Oct. 22, 1940 |
| 2,240,911 | Polzer | May 6, 1941 |
| 2,251,917 | Crosby | Aug. 12, 1941 |
| 2,268,102 | Attula | Dec. 30, 1941 |
| 2,311,412 | Pankonin | Feb. 16, 1943 |
| 2,312,142 | Abrams | Feb. 23, 1943 |
| 2,352,475 | Faltz | June 27, 1944 |
| 2,381,192 | Vancura | Aug. 7, 1945 |

FOREIGN PATENTS

| Number | Country | Date |
| --- | --- | --- |
| 118,690 | Australia | July 7, 1944 |